(12) United States Patent
Kim

(10) Patent No.: US 6,353,603 B1
(45) Date of Patent: Mar. 5, 2002

(54) TERMINAL CONTROL DEVICE AND METHOD FOR SOFT-HANDOFF BETWEEN TERMINALS HAVING DIFFERENT FREQUENCIES

(75) Inventor: Joon-Lae Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/120,921

(22) Filed: Jul. 22, 1998

(51) Int. Cl.[7] ............................................. H04B 7/216
(52) U.S. Cl. ...................... 370/335; 370/338; 370/342
(58) Field of Search ................................. 370/331, 332, 370/334, 349, 335, 342; 455/436, 437, 439, 438, 442, 443, 525

(56) References Cited

U.S. PATENT DOCUMENTS

| | | | |
|---|---|---|---|
| 5,859,840 A | * | 1/1999 | Tiedemann, Jr. et al. ... 370/335 |
| 5,920,554 A | * | 7/1999 | Nakamura et al. .......... 370/335 |
| 5,950,131 A | * | 9/1999 | Vilmur ....................... 455/434 |
| 6,175,736 B1 | * | 1/2001 | Lee et al. ................... 455/442 |

\* cited by examiner

*Primary Examiner*—Chau Nguyen
*Assistant Examiner*—Thieu Tran
(74) *Attorney, Agent, or Firm*—Dilworth & Barrese, LLP

(57) ABSTRACT

An apparatus and method for providing a soft handoff between base stations using different operating frequencies. The apparatus includes a RAKE receiver having a plurality of main paths and an extra path, a first local oscillator for the main paths and a second local oscillator for the extra path. When the apparatus is located between two base stations using the different frequencies, both the first and second local oscillators are enabled and communication with the target base station is established using a demodulation signal output from the extra path. Thereafter, as the apparatus moves into coverage of a target base station, the oscillation frequency of the first local oscillator is adjusted for the frequency of the target base station. Upon stabilization of the first local oscillator, the extra path is disabled and communication with the target base station is established using modulation signals output from the main paths of the RAKE receiver.

10 Claims, 4 Drawing Sheets

TERMINAL CONTROL DEVICE AND METHOD FOR SOFT-HANDOFF BETWEEN TERMINALS HAVING DIFFERENT FREQUENCIES

BACKGROUND

1. Technical Field

The present application relates generally to a handoff process in a cellular communication system and, in particular, to an apparatus and method for controlling a soft handoff between base stations using different operating frequencies in a CDMA (Code Division Multiple Access) terminal.

2. Description of the Related Art

In general, during a conversation on a mobile telephone, a handoff operation can occur between a source base station and a target base station ("inter-station handoff") and within a given base station ("intra-station handoff"). The inter-station handoff operation is very important for maintaining call continuity during mobile communication. The conventional AMPS (Advanced Mobile Phone Service) system does not support a soft handoff method, which sometimes results in a call disconnection when a portable terminal (e.g., cellular phone) travels through the boundary between adjacent base stations. Similarly, a CDMA system does not support a soft handoff between base stations using the different frequencies, which results in call disconnection. The call disconnection or reception clatter which occurs during a conversation as a result of a conventional handoff operation is offensive to the user. Further, when the CDMA terminal provides a data communication service, a call disconnection during the data transmission may lead to loss of data being transmitted. Accordingly, the user cannot transmit data using the CDMA portable terminal.

Referring now to FIG. 1, a diagram illustrates a general handoff condition. In FIG. 1, reference characters A, B and C denote adjacent base stations having operating frequencies f1, f1 and f2, respectively. A portable terminal PT communicates with the base station to which it belongs by using the operating frequency allocated to the base station. When the portable terminal PT travels into coverage of an adjacent base station, however, the PT must be tuned to the frequency of the new base station.

Referring now to FIG. 2, a diagram illustrates a conventional portable CDMA terminal. A first local oscillator (LO) 13 generates a first local oscillation signal and a first mixer 12 mixes an RF (Radio Frequency) signal (e.g., the operating frequency signals from the base stations) received through an antenna 11 with the first local oscillation signal. A second LO 16 generates a second local oscillation signal and a second mixer 15 mixes the signal output from the first mixer 12 with the second local oscillation signal. The CDMA terminal also includes a RAKE receiver 30 which has a plurality of paths 18–21. Each of the paths 18–21 receives a signal which is output from the second mixer 15. A combiner 23 in the RAKE receiver 30 receives the signals from each of the paths 18–21 and independently outputs each of the signals to a decoder 24 which decodes the signal output from the combiner 23. A controller 40 generates signals for controlling the oscillation frequencies generated by the first and second LOs 13 and 16, for controlling the connection between the paths 18–21 and the combiner 23, and for controlling the operation of the decoder 24. The paths 18–21 are composed of fingers and the signal output from the second mixer 15 is applied to the fingers of the respective paths 18–21 at a specified time difference.

The conventional handoff operation will now be explained with reference to FIGS. 1 and 2. For instance, when base stations A and B, which use the same frequency f1, have the same frame offset, a soft handoff process is performed. On the other hand, a handoff between base stations A and C or between base stations B and C requires a frequency switching process since each pair of base stations utilizes different frequencies f1 and f2. The frequency switching operation can result in call disconnection. An area represented by AC in FIG. 1 denotes a common coverage area of base stations A and C. Since base stations A and C are shown using different frequencies (i.e., f1 and f2, respectively), the common area AC has both frequencies f1 and f2. The conventional portable terminal (FIG. 2), however, cannot simultaneously demodulate both operating frequencies f1 and f2 when it is located in common area AC since the portable terminal includes the single LO 13. Therefore, when the conventional portable terminal demodulates the RF signal received from the base station to a baseband signal, it can only process the signal received from the base station having the corresponding frequency. Therefore, as the portable terminal travels into the coverage area of base station B, the controller 40 must adjust the oscillating frequency of the LO 13 in order to demodulate the operating frequency of base station B. This frequency switching operation can lead to call disconnection.

SUMMARY OF THE INVENTION

The present application is directed to an apparatus and method for providing a soft handoff between base stations having different operating frequencies.

In one aspect, an apparatus for controlling soft handoff between a source base station generating a first operating frequency signal and a target base station generating a second operating frequency signal, comprises:

a first local oscillator for generating a first local oscillation signal;

a first mixer for mixing the first and second operating frequency signals with the first local oscillation signal;

a second local oscillator for generating a second local oscillation signal;

a second mixer for mixing a signal output from the first mixer with the second local oscillation signal;

a third local oscillator for generating a third local oscillation signal;

a third mixer for mixing the first and second operating frequency signals with the third local oscillation signal;

a fourth mixer for mixing an output signal of the third mixer with the second local oscillation signal;

a RAKE receiver having a plurality of main paths for receiving an output signal of the second mixer, an extra path for receiving an output signal of the fourth mixer, and a combiner for independently providing the signals provided to the main paths and the extra path to an output node thereof;

a decoder for decoding a signal output from the combiner; and a controller for controlling the first and third local oscillators, the RAKE receiver and the decoding means, such that when the apparatus moves from an operating area covered by the source base station into an operating area covered by both the source base station and the target base station, the controller causes the first local oscillator to generate the first local oscillation signal to demodulate the first operating frequency signal, enables the third local oscillator to generate the third local oscillation signal to demodulate the second operating frequency, enables the extra path for receiving the signal from the fourth mixer, and commands the combiner to receive a demodulation signal output from the extra path thereby allowing the apparatus to simultaneously process the first and second operating frequency signals from the source and target bases stations, respectively.

In another aspect, when the apparatus moves from the operating area covered by both the source and target base stations to an operating area covered by the target base station, the controller causes the first local oscillator to adjust the first oscillation signal to demodulate the second operating frequency signal of the target base station and, upon stabilization of the adjusted first local oscillator, disables the extra path and commands the combiner to receive demodulation signals output from the plurality of main paths.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
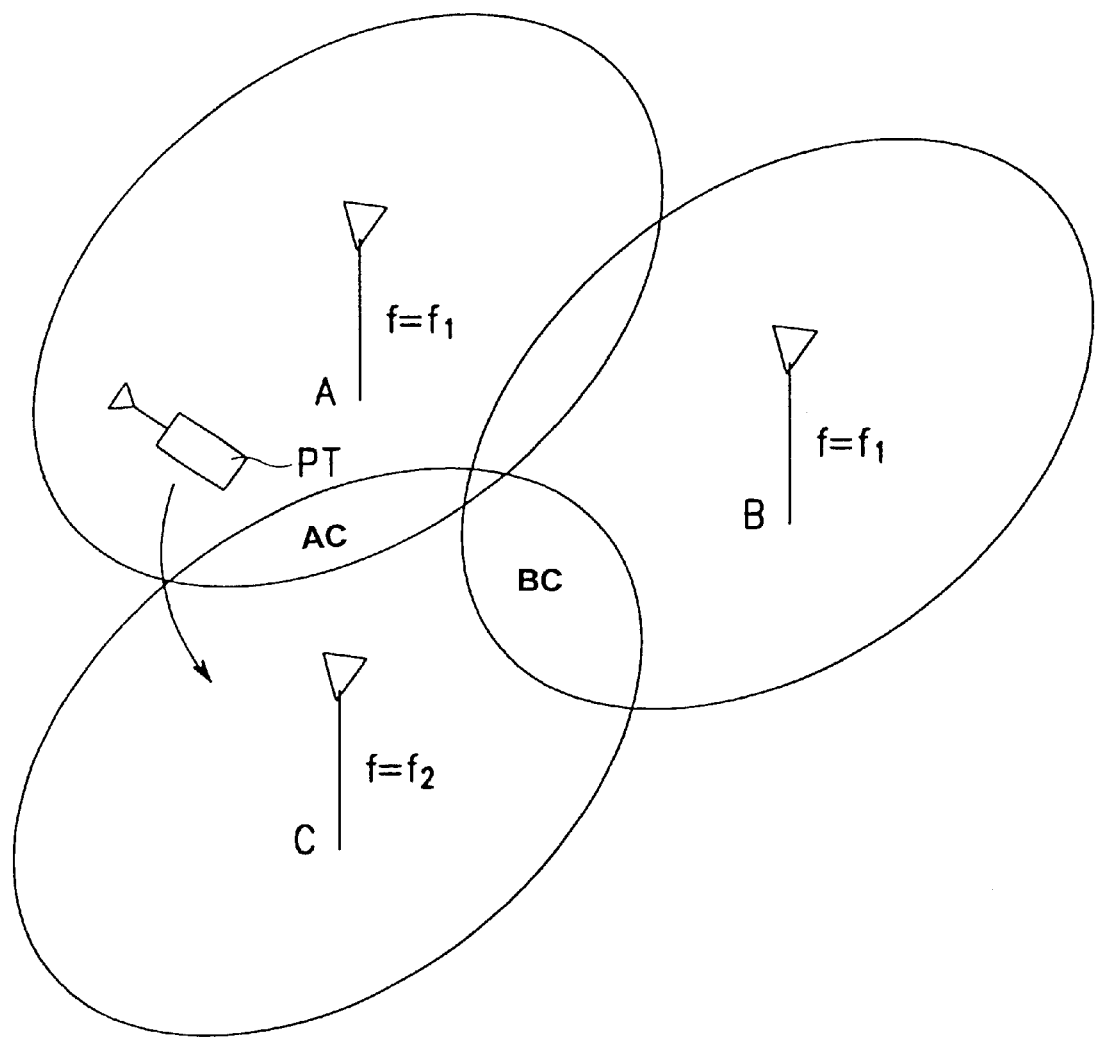
FIG. 1 is a diagram which illustrates a handoff condition.
Figure 2:
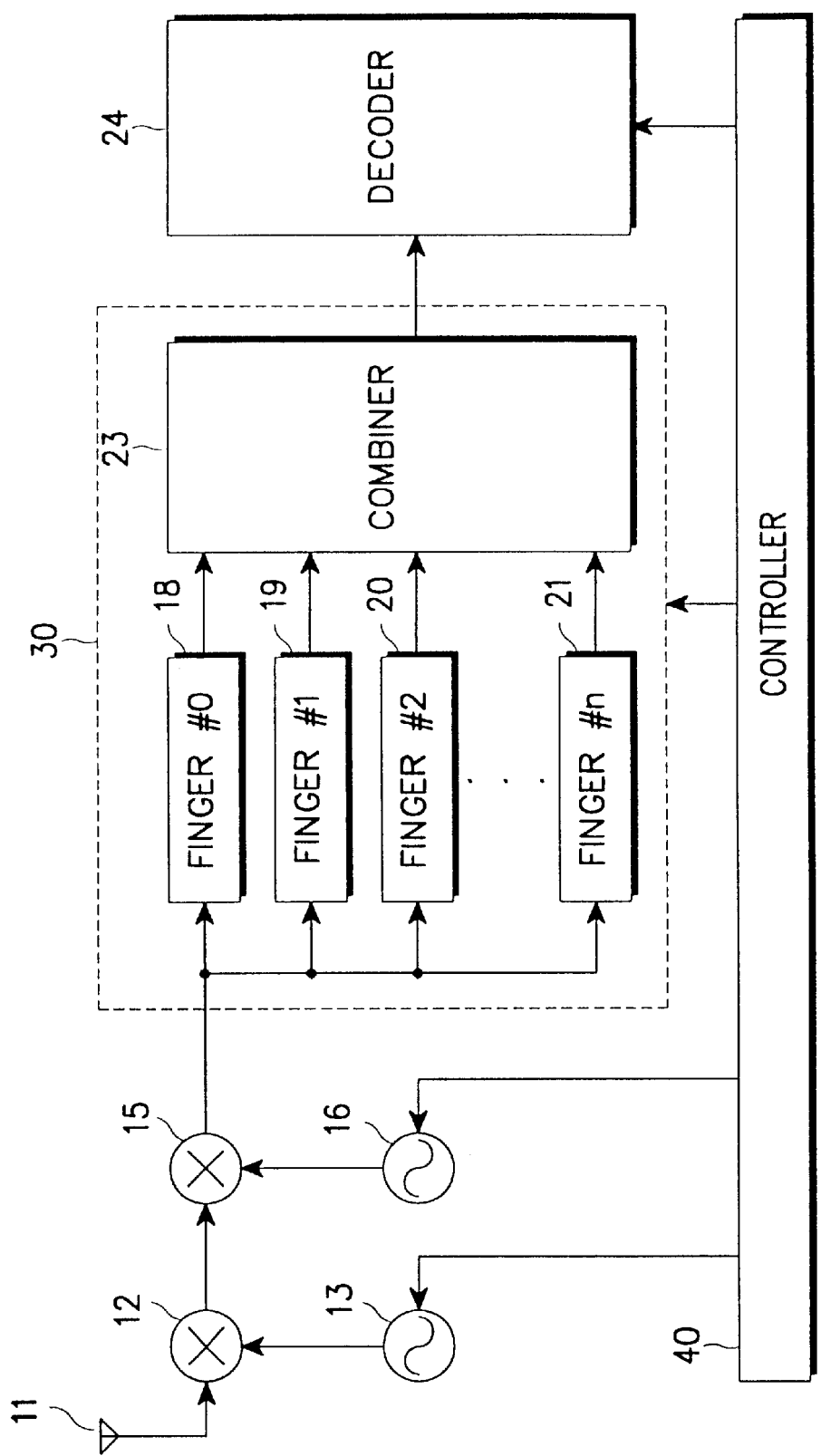
FIG. 2 is a diagram of a conventional CDMA terminal.

It is to be understood that in the following description of preferred embodiments, specific details are set forth to provide a more thorough understanding of the present invention, notwithstanding that one skilled in the art may practice the invention without these specific details. In other instances, a detailed description of well known functions or constructions have been omitted so as to not obscure the present invention. It is to be further understood that in the accompanying drawings, similar reference numerals are used to denote elements having similar or equivalent constructions.

Figure 3:
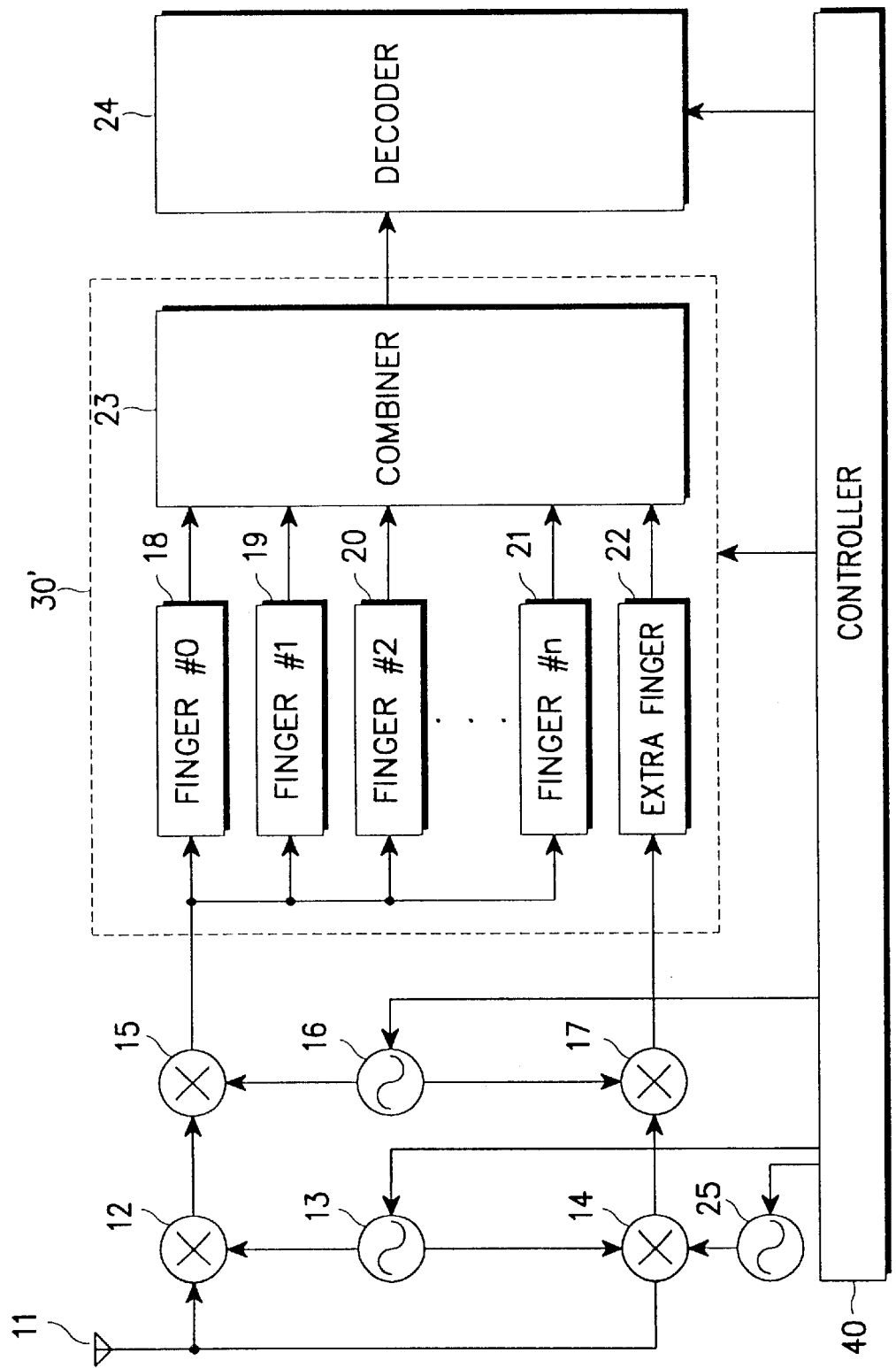
FIG. 3 is a diagram of a CDMA terminal according to an embodiment of the present invention.

Referring now to FIG. 3, a diagram illustrates a CDMA terminal according to one embodiment of the present invention. As illustrated, a first LO 13 generates a first local oscillation signal and a first mixer 12 mixes an RF signal (e.g., a base station operating frequency signal) received through an antenna 11 with the first local oscillation signal. A second LO 16 generates a second local oscillation signal and a second mixer 15 mixes a signal output from the first mixer 12 with the second local oscillation signal. A third LO 25 generates a third local oscillation signal and a third mixer 14 mixes the RF signal received through the antenna 11 with the third local oscillation signal. A fourth mixer 17 mixes an output signal from the third mixer 14 with the second local oscillation signal.

A RAKE receiver 30 includes a plurality of main paths 18–21 and corresponding fingers (i.e., fingers #0–#n) each receiving an output signal from the second mixer 15. The RAKE receiver 30 also includes a extra path 22 (and corresponding extra finger) which receives an output signal from the fourth mixer 17. A combiner 23 in the RAKE receiver 30 receives the signals from each of the paths 18–21, as well as extra path 22, and independently outputs each of the signals to a decoder 24. A controller 40 generates signals for controlling the oscillation frequencies of the first LO 13, the second LO 16 and third LO 25, as well as for controlling the connection between the main paths 18–2 and the extra path 22 and the combiner 23 and for controlling the operation of the decoder 24.

A soft handoff operation of the portable terminal will now be discussed with reference to FIGS. 1, 3 and 4. When base stations A and B, which use the same frequency f1, have the same frame offset, the soft handoff is performed. During the soft handoff, the extra finger 22 is disabled, and the portable terminal communicates with the base station using paths 18–21 (i.e., fingers #0–#n). However, when the terminal travels to a common area AC (FIG. 1) between base stations A and C or to a common area BC between base stations B and C (which have the different frequencies f1 and f2, respectively), the portable terminal performs a soft handoff using the extra path 22 (i.e., the extra finger). For example, when the portable terminal travels from the area covered by source base station A (where only f1 exists) to the common area AC (where both operating frequencies f1 and f2 exist), the first LO 13 generates a first local oscillation signal which is suitable for demodulating the operating frequency signal f1 (for base station A) and the third LO 25 generates a third local oscillation signal which is suitable for demodulating the operating frequency signal f2 (for base station B). In other words, while the portable terminal is located in the common area AC, the first LO 13 signal is mixed (via mixer 12) with the received RF signals (i.e., the base station frequencies), the output of mixer 12 is mixed (via mixer 15) with the second LO 16 signal and the output of the second mixer 15 is applied to paths 18–21 in the RAKE receiver 30. On the other hand, the third LO 25 signal is mixed with the received RF signals, the output of mixer 14 is mixed (via mixer 17) with the second LO 16 signal and the output of the mixer 17 is applied to the extra path 22.

Next, while the portable terminal is simultaneously processing (demodulating) the operating frequency signals received from base stations A and C, if the portable terminal PT moves into the area covered by the target base station C from the common area AC, the portable terminal will continue to communicate with base station C using the demodulation signal output from the extra finger 22 until the oscillation frequency of the first LO 13 is changed and stabilized for demodulating frequency f2 (i.e., the operating frequency of base station C). After stabilization of the first LO 13 for the new frequency (e.g., f2 of the target base station), the portable terminal PT disables the extra finger 22, and the demodulated signals are applied to the main paths 18–21.

Figure 4A:
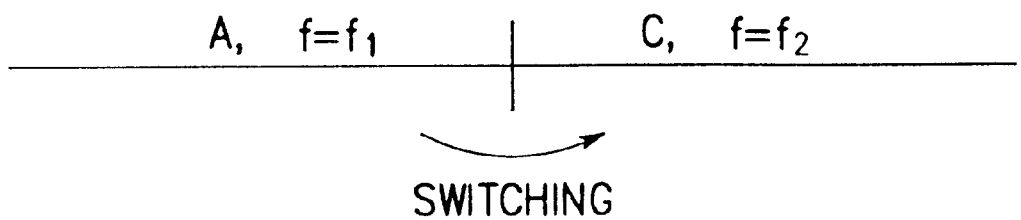
FIG. 4A is a diagram which illustrates a conventional handoff operation.
Figure 4B:
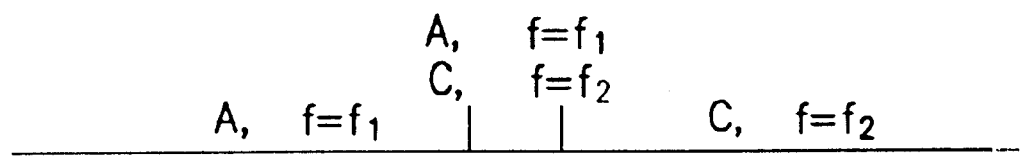
FIG. 4B is a diagram which illustrates a soft handoff operation in accordance with the present invention.

Referring to FIG. 4A, a diagram illustrates an the conventional handoff (i.e., abrupt frequency switching process) when the conventional terminal PT passes through a boundary between a source base station A and a target base station C having different operating frequencies. The abrupt frequency switching process can result in call disconnection. On the other hand, FIG. 4B illustrates a soft frequency switching process when the portable terminal PT according to the present invention passes through the boundary between the source base station A and the target base station C having different operating frequencies. The portable terminal of the present invention can support a soft handoff between a source and a target base station having different frequencies, thereby improving call stability (or continuity). Therefore, the portable terminal of the present invention terminal is suitable for data communication service that requires call continuity.

Although the illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. An apparatus for providing soft handoff between a source base station using a first operating frequency signal in a first coverage area and a target base station using a second operating frequency signal in a second coverage area, wherein a portion of said first area and a portion of said second area overlap to form a common coverage area, said apparatus comprising:

first demodulating means for demodulating said first operating frequency signal of said source base station when said apparatus is located in one of said first coverage area and said common area, and for demodulating said second operating frequency signal of said target base station when said apparatus is located in said second coverage area;

second demodulating means for demodulating said second operating frequency of said target base station when said apparatus is located in said common area; and processing means for simultaneously processing said demodulated first frequency and said demodulated second frequency when said apparatus is located in said common area.

2. The apparatus of claim 1, further comprising:
    controlling means for controlling said first demodulation means, said second demodulating means and said processing means, such that when said apparatus moves into said second coverage area of said target base station from said common area, said controlling means disables said second demodulating means and causes said first demodulating means to demodulate said second operating frequency of said target base station and causes said processing means to process said demodulated second operating frequency of said target base station.

3. The apparatus of claim 1, wherein said first demodulation means comprises:
    a first local oscillator for generating a first local oscillation signal;
    a first mixer for mixing said first local oscillation signal with said first operating frequency signal of said source base station when said apparatus is located in one of said first coverage area and said common area, and mixing said first local oscillation signal with said second operating frequency signal of said target base station when said apparatus is located in said second coverage area;
    a second local oscillator for generating a second local oscillation signal; and
    a second mixer for mixing a signal output from said first mixer with said second local oscillation signal.

4. The apparatus of claim 3, wherein said second demodulation means comprises:

a third local oscillator for generating a third local oscillation signal;
    a third mixer for mixing said third local oscillation signal with said second operating frequency signal of said target base station when said apparatus is located in said common area; and
    a fourth mixer for mixing an output signal of said third mixer with said second local oscillation signal.

5. The apparatus of claim 2, wherein said processing means comprises:
    a RAKE receiver having a plurality of main paths each receiving said demodulated signal from said first demodulating means, and an extra path for receiving said demodulated signal from said second demodulating means; and
    a combiner, operatively connected to said RAKE receiver and having an output node associated therewith, for independently providing signals input from each of said plurality of main paths and said extra path to said output node; and
    a decoder, operatively connected to said output node of said combiner, for decoding said signals provided by said combiner, whereby said controlling means enables said extra path when said apparatus moves into said common area and disables said extra path when said apparatus is one of located in said first coverage area and moves into said second coverage area from said common area.

6. An apparatus for controlling soft handoff between a source base station generating a first operating frequency signal and a target base station generating a second operating frequency signal, comprising:
    a first local oscillator for generating a first local oscillation signal;
    a first mixer for mixing said first and second operating frequency signals with said first local oscillation signal;
    a second local oscillator for generating a second local oscillation signal;
    a second mixer for mixing a signal output from the first mixer with said second local oscillation signal;
    a third local oscillator for generating a third local oscillation signal;
    a third mixer for mixing said first and second operating frequency signals with said third local oscillation signal;
    a fourth mixer for mixing an output signal of said third mixer with said second local oscillation signal;
    a RAKE receiver having a plurality of main paths for receiving an output signal of said second mixer, an extra path for receiving an output signal of said fourth mixer, and a combiner for independently providing said signals provided to said main paths and said extra path to an output node thereof;
    a decoder for decoding a signal output from said combiner; and
    a controller for controlling said first and third local oscillators, said RAKE receiver and said decoding means, such that when said apparatus moves from an operating area covered by said source base station into an operating area covered by both said source base station and said target base station, said controller causes said first local oscillator to generate said first local oscillation signal to demodulate said first operating frequency signal, enables said third local oscillator to generate said third local oscillation signal to demodulate said second operating frequency, enables said extra path for receiving said signal from said fourth mixer, and commands said combiner to receive a demodulation signal output from said extra path thereby allowing said apparatus to simultaneously process said first and second operating frequency signals from said source and target bases station, respectively.

7. The apparatus of claim 6, wherein when said apparatus moves from said operating area covered by both said source and target base stations to an operating area covered by said target base station, said controller causes said first local oscillator to adjust said first oscillation signal to demodulate said second operating frequency signal of said target base station and, upon stabilization of said adjusted first local oscillator, disables said extra path and commands said combiner to receive demodulation signals output from said plurality of main paths.

8. In a portable terminal having a first demodulating means, a second demodulating means, and a RAKE receiver having a plurality of paths, a method for controlling a soft handoff between a source base station generating a first operating frequency signal and a target base station generating a second operating frequency signal, comprising the steps of:

simultaneously enabling said first and second demodulating means, when said portable terminal moves into an operating area that is covered by both the source base station and the target base station, such that said first demodulation means is adapted to demodulate said first operating frequency signal of said source base station and said second demodulating means is adapted to demodulate said second operating frequency signal of said target base station;

simultaneously processing said demodulated first operating frequency signal and said demodulated second operating frequency signal;

adjusting said first demodulating means to demodulate said second operating frequency signal of said target base station when said portable terminal moves into an operating area covered by said the target base station; and processing said demodulated second operating frequency of said target base station after said adjustment of said first demodulating means.

9. The method of claim 8, wherein the step of simultaneously processing includes the substep of:

providing said demodulated first operating frequency signal to a set of main paths of said plurality of paths of said RAKE receiver and providing said demodulated second operating frequency signal to an extra path of said plurality of paths of said RAKE receiver such that said demodulated first and second operating frequency signals can be processed independently of eachother.

10. The method of claim 8, wherein said step of processing said demodulated second operating frequency of said target base station after said adjustment of said first demodulating means comprises the substeps of:

disabling said extra path of said RAKE receiver; and providing said demodulated second operating frequency signal of said target base station from said first demodulation means to said main paths of said RAKE receiver, such that communication with said target base station is achieved by processing said demodulation signals output from said main paths.

* * * * *